United States Patent [19]

Rasoulian et al.

[11] Patent Number: 5,926,833

[45] Date of Patent: Jul. 20, 1999

[54] METHOD AND SYSTEM ALLOWING DIRECT DATA ACCESS TO A SHARED DATA STORAGE SUBSYSTEM BY HETEROGENEOUS COMPUTING SYSTEMS

[75] Inventors: Behrouz Rasoulian; Renato John Recio, both of Austin, Tex.

[73] Assignee: International Business Machines Corporation, Armonk, N.Y.

[21] Appl. No.: 08/822,891

[22] Filed: Mar. 24, 1997

[51] Int. Cl.$^6$ ........................................ G06F 13/00
[52] U.S. Cl. .................. 711/147; 711/124; 711/154; 711/163; 395/500; 395/183.04
[58] Field of Search ................... 711/114, 147, 711/124, 154, 163; 395/500, 835, 182.02, 200.43, 183.04

[56] References Cited

U.S. PATENT DOCUMENTS

| | | | |
|---|---|---|---|
| 4,630,196 | 12/1986 | Bednar et al. . | |
| 4,835,685 | 5/1989 | Kun . | |
| 5,214,768 | 5/1993 | Martin et al. ........................... | 711/114 |
| 5,239,643 | 8/1993 | Blount et al. . | |
| 5,325,517 | 6/1994 | Baker et al. . | |
| 5,345,586 | 9/1994 | Hamala et al. ........................... | 707/10 |
| 5,363,497 | 11/1994 | Baker et al. . | |
| 5,369,749 | 11/1994 | Baker et al. . | |
| 5,369,767 | 11/1994 | Dinwiddie et al. . | |
| 5,388,215 | 2/1995 | Baker et al. . | |
| 5,412,791 | 5/1995 | Martin et al. ........................... | 7411/114 |
| 5,463,754 | 10/1995 | Beausoleil et al. ................. | 395/200.43 |
| 5,471,609 | 11/1995 | Yudenfriend et al. ............. | 395/182.02 |
| 5,625,841 | 4/1997 | Dawkins et al. ........................ | 395/835 |
| 5,758,125 | 5/1998 | Misinai et al. ........................... | 395/500 |

*Primary Examiner*—John W. Cabeca
*Assistant Examiner*—Fred F. Tzeng
*Attorney, Agent, or Firm*—Richard A. Henkler; Jack V. Musgrove; Andrew J. Dillon

[57] ABSTRACT

A method and system are provided which allow heterogeneous computing systems to have direct access to the same data storage areas on a shared data storage subsystem such that the method and system are transparent to the heterogeneous computing systems. The method and system achieve the foregoing via the following steps. A data storage subsystem controller queries all computing systems having direct access to the same data storage areas of a shared data storage subsystem as to the operating systems utilized by such computing systems. In response to answers received in response to the queries, the data storage subsystem controller creates and stores meta-data which associates each computing system having direct access with whatever operating system is running on each computing system having direct access. In response to a request from a computing system having direct access for access to a data storage area within the shared data storage subsystem, the data storage subsystem controller retrieves the stored meta-data associated with the computing system which is requesting access to a data storage area within the shared data storage subsystem. The data storage subsystem controller utilizes the retrieved meta-data to correctly interpret and respond to the request for access to a data storage area in a manner consonant with the operating system of the computing system which is requesting access to a data storage area within said shared data storage subsystem.

20 Claims, 6 Drawing Sheets

METHOD AND SYSTEM ALLOWING DIRECT DATA ACCESS TO A SHARED DATA STORAGE SUBSYSTEM BY HETEROGENEOUS COMPUTING SYSTEMS

BACKGROUND OF THE INVENTION

1. Technical Field

The present invention relates, in general, to an improved data storage method and system to be utilized with heterogeneous computing systems. In particular, the present invention relates to an improved data storage method and system to be utilized with heterogeneous computing systems and which allows the heterogeneous computing systems direct access to the same data storage areas in a shared data storage subsystem. Still more particularly, the present invention relates to an improved data storage method and system to be utilized with heterogeneous computing systems and which allows the heterogeneous computing systems direct access to the same data storage areas in a shared data storage subsystem by creating a shared data storage subsystem controller which insures that any request for data is interpreted and responded to in a manner appropriate to the operating system of the computing system making the request for data.

2. Description of Related Art

Traditionally every computer system vendor (e.g. IBM, SUN, CONVEX) has made or utilized vendor specific data storage subsystems specifically designed to be compatible with the computing equipment and operating system being utilized by the vendor. Consequently, when the computing equipment read or wrote data to its assigned data storage subsystem the operation was generally successful because the storage system was specifically designed to work with the computing equipment in that they "spoke the same language."

The advantage of such vendor-specific data storage subsystems was that the computing equipment and data storage subsystems were generally compatible and worked well together. There were, however, multiple disadvantages, a few of which were (1) users were barred from buying other computer equipment from other vendors utilizing different operating systems due to compatibility problems; (2) smaller suppliers experienced difficulty due to an inability to manufacture data storage subsystems for the various different vendor hardware-operating system configurations; and (3) data managers often had difficulty explaining to non-technical managers the foregoing compatibility issues.

In an effort to alleviate the foregoing noted disadvantages, vendors have responded and today the industry is moving to an environment where the open system concept (meaning, among other things, the option of having other than vendor specific data storage devices attached to certain vendor's systems) is becoming critical. That is, today customers are buying different pieces of hardware from different vendors and they don't necessarily like to "throw away" their hardware if they (the customers) decide to obtain new computing equipment from a different vendor than used previously. Instead, today's customers expect and desire that hardware purchased "work together" irrespective of the purchased hardware's vendor of origin. In practical terms, this means that a vendor stands a better chance of remaining viable if it can provide compatibility with multiple different systems.

With respect to data storage subsystems, the foregoing means that if a customer has an IBM system, a SUN system, and a Hewlett-Packard system, and if the customer only has data storage needs requiring the capacity of ten data storage disks, the customer does not want to have to have ten disks the IBM system, ten disk or the SUN system, and ten disks for the Hewlett-Packard system because the data accessing schemes of the systems are incompatible. Instead, the customer prefers to have one set of storage devices which can be accessed by all systems and which allows the sharing of data on the data storage subsystems by all attached computing systems.

In the abstract sense, the foregoing can be posed as the problem of sharing data storage subsystems between heterogeneous computing systems. The problem of sharing data storage subsystems can be viewed as three separate "cases of sharing."

Case 1 is where there is physical sharing of a data storage device but no actual data sharing. This is generally the current state of the industry. This case is demonstrated by the previous example of three systems each requiring ten disks. In actuality, all the storage that is needed could theoretically be supplied by ten disks. However, since the different computing systems use different operating systems, it is necessary to buy separate storage subsystems for each computing system. These three different storage subsystems are then put into one cabinet, or one physical location. Thus, externally (that is, viewing the data storage subsystem cabinet) it may look "as if" the three different systems are using one data storage subsystem, and it may appear "as if" all systems can access and are sharing the same data, but from a logical and storage requirement point of view the system still uses data storage resources equal to thirty separate disks. The reason for this is that the three different systems still are not reading and writing to the same data storage device. Thus, although from the outside it may look like the three systems are using the same storage system, in reality three times the capacity actually required is being used (since separate data store subsystems still exist for each heterogeneous computing system), so this case (Case 1) doesn't really solve, or address, the problem of sharing data storage subsystems.

Case 2 is where all applications on every system share all data within a common data storage subsystem. This is theoretically the ideal case. However, due to the difficulties in managing the meta-data required for different operating systems and the middleware required for different vendor systems, this case is practically unachievable. There is no solution for this case in the industry today.

Case 3 is a subset of Case 2. Case 3 is the situation where one application program (such as a database program) on every system has direct access to all data in a shared data storage subsystem. In this level of sharing, the same application running on two or more heterogeneous systems can directly access all data within the shared data storage subsystem. This means that an application running on two or more heterogeneous systems can actually read and write to the same physical locations within a shared data storage subsystem, such that when the application on one system requests data from logical Linear Block Address twenty it will retrieve the same data that a copy of the same application running on another heterogeneous system will retrieve if the same application on the other system requests the data from logical Linear Block Address twenty (likewise for writing to certain Linear Block Areas). There is no solution for this level of sharing in the industry today.

The reason that there is no solution for this (Case 3) level of sharing within the industry today is that while the same application program running on heterogeneous computing systems might be requesting access to the same LBA, the da storage subsystem is receiving those requests via the various different operating system commands of the heterogeneous computing systems. At present, there are no known solutions within the prior art which empowers the data storage subsystem to allow heterogeneous computing systems direct access to the same storage areas within a data storage subsystem. Thus, it is apparent that a need exists for a method and system which will allow direct access to the same storage data storage areas in a shared data storage subsystem.

SUMMARY

It is therefore one object of the present invention to provide an improved data storage method and system to be utilized with heterogeneous computing systems.

It is therefore another object of the present invention to provide an improved data storage method and system to be utilized with heterogeneous computing systems and which allows an application running on heterogeneous computing systems direct access to the same data storage areas in a shared data storage subsystem.

It is yet another object of the present invention to provide an improved data storage method and system to be utilized with heterogeneous computing systems and which allows an application running on heterogeneous computing systems direct access to the same data storage areas in a shared data storage subsystem by creating a shared data storage subsystem controller which insures that any request for data is interpreted and responded to in a manner appropriate to the operating system of the computing system making the request for data.

The above and other objects are achieved as is now described. A method and system are provided which allow heterogeneous computing systems to have direct access to the same data storage areas on a shared data storage subsystem such that the method and system are transparent to the heterogeneous computing systems. The method and system achieve the foregoing via the following steps. A data storage subsystem controller queries all computing systems having direct access to the same data storage areas of a shared data storage subsystem as to the operating systems utilized by such computing systems. In response to answers received in response to the queries, the data storage subsystem controller creates and stores meta-data which associates each computing system having direct access with whatever operating system is running on each computing system having direct access. In response to a request from a computing system having direct access for access to a data storage area within the shared data storage subsystem, the data storage subsystem controller retrieves the stored meta-data associated with the computing system which is requesting access to a data storage area within the shared data storage subsystem. The data storage subsystem controller utilizes the retrieved meta-data to correctly interpret and respond to the request for access to a data storage area in a manner consonant with the operating system of the computing system which is requesting access to a data storage area within said shared data storage subsystem.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

Figure 1:
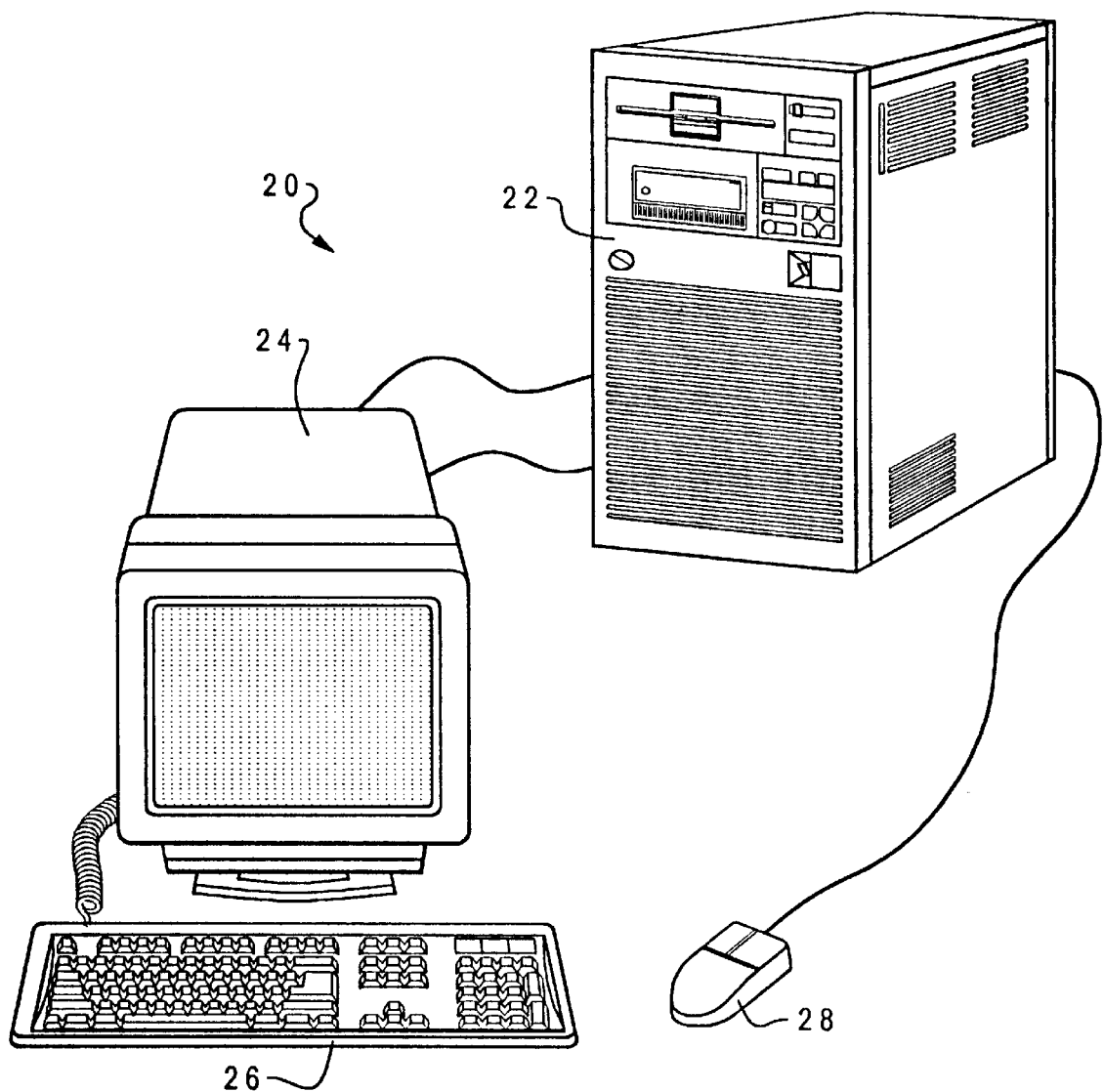
FIG. 1 depicts a pictorial representation of a data-processing system which can be utilized in accordance with the method and system of the present invention.

In order to solve and satisfy the aforementioned problems and needs, the present invention creates an improved method and process by which data on a data storage subsystem is accessed. In order to understand the improved method and process of the present invention, it is useful to first discuss how such data is normally accessed, and then describe how the present invention diverges from and improves upon the common way in which such data is accessed.

Data storage subsystems exist to allow the easy access and manipulation of data. Data is stored within data storage subsystems at specific addresses.

Addresses correspond to the location of data within a data storage subsystem. It is well known within the art that there are many types of data storage devices that ID can be resident within each data storage subsystem. One type of data storage device is a data storage disk, which will be discussed here by way of illustration.

A data storage disk is a physical device. Data is stored at specific physical locations on the data storage disk. Thus, to effectively access and manipulate the data it is necessary to assign physical addresses to the disk.

It is well known within the art that a common scheme for an application to physically address regions within each data storage disk is to divide the data storage disk into different physical regions ("blocks") called Linear Blocks (512 Bytes). Linear Blocks are accessed via Linear Block Addresses (LBA). Each LBA yields 512 bytes of storage, and thus in practice linear blocks on the disk are addressed from LBA 0 through LBA N where N is the capacity of the drive (i.e. MB, GB divided by 512 bytes. It will be understood by those in the art that the 512 byte denominator can be higher, but present operating systems use 512 bytes.

In a situation where an application program running on only one machine desires to access data, it requests that the operating system of the computer on which it is running retrieve data from a certain LBA. Consequently, the operating system then communicates with the disk controller and requests that the disk controller retrieve the data associated with the specific LBA. In response to this request, the disk controller then interprets the command received and goes to the physical address denoted by the LBA specified, retrieves the data, and then returns the retrieved data to the operating system in response to the LBA received.

Often, it is desired that copies of an application run on more than one individual machine, but in such a fashion that it looks to the user as if the application is running on only one machine. This can be done by applications programs which do clustering. In clustering, the applications share data storage resources such that data within each application program running on each individual machine will be stored to and retrieved from the same data storage area within the data storage subsystem. In homogeneous clusters, the application uses the single operating system's LBA to address data. Each operating system has the same logical volume manager, so no LBA incompatibilities exist.

Application programs (e.g. ORACLE) exist which could do clustering even when copies of the application program are running on heterogeneous computing systems. As before, such applications insure that the same data are associated with the same logical storage areas.

The problem that arises, though, is that although the heterogeneous systems are attempting to access the same LBA, each heterogeneous system is attempting to access the LBA in its own "language." That is, if one application running on a first UNIX based system desires to access data, that application will consult the operating system's specific logical or physical volume manager which uniquely partitions the disk as appropriate to that first UNIX based operating system. On the other hand, if the same application running on a second (and different) UNIX system desires to access the same data, that application will consult that operating system's specific logical or physical volume manager which uniquely partitions the disk as appropriate to that second UNIX based operating system.

The problem with the foregoing is that the data storage subsystem controller, although it is receiving requests for the same LBA, is receiving those requests in two different "languages" (mapping of LBAs to each specific operating system). This is a problem that multiplies in complexity as the number and type of systems sharing the data storage subsystem increases. There is no known solution to this problem, other than duplicating the application and its data or partitioning the application and its data. Both of the foregoing are difficult to manage and more expensive than data sharing.

The present invention provides a method for an application to share data. The method and process of the present invention does this by actually allowing the application to truly share the data on the data storage subsystem, even if the applications are running on heterogeneous machines.

The present invention uses the concept of meta-data (data about data) which will be stored on the data storage subsystem itself. The meta-data will be used by the shared data storage subsystem controller of the present invention to ensure that the shared data subsystem controller returns the correct data in response to a request for data received from an application running on two or more heterogeneous computing systems sharing the data storage subsystems.

The meta-data stored will contain data used by the subsystem controller to correctly interpret data requests received from various attached heterogeneous computing systems.

In creating and storing the aforementioned meta-data, the shared data storage subsystem controller will make use of a logical volume concept. That is, in order to store the meta-data the shared data subsystem controller will need to keep track of how many LBAs have been consumed by the meta-data and adjust requests for data accordingly. This process will be completely transparent to the applications programs running upon the heterogeneous systems. That is, from the viewpoint of the application programs, it will appear to the application programs "as if" they were sharing the data storage subsystems with application programs running on homogeneous machines in that the functioning of the shared data storage subsystem controller of the present invention will be totally transparent to them.

Essentially, the present invention accomplishes the foregoing identified tasks in three steps:

(1) At initial program load, the data storage subsystem controller queries all computing systems sharing the data storage subsystem, and asks what operating systems are being run on those systems.

(2) Aft receiving the information related to the heterogeneous computing systems sharing the data storage subsystem, the data storage subsystem controller stores meta-data at the initial LBAs of the data storage subsystem such that the stored meta-data is associated with the specific computing systems sharing the data storage subsystem. For reasons that will become apparent, the meta-data is stored at the lowest referenced LBAs (e.g. AIX meta-data and identifiers of the computing systems running it are stored in LBA 0 through LBA 3, and another version of UNIX denoted as OSX meta-data and identifiers of the computing systems running it are stored in LBA 4 through LBA 9) in the data storage subsystem.

(3) Subsequently, any computing system requesting access to an LBA is first paired with its meta-data, the meta-data is then read by the subsystem controller which allows the subsystem controller to understand the operating system commands from that particular computing system, and subsequently the LBA is accessed in the manner directed by the requesting computer system.

Figure 5A:
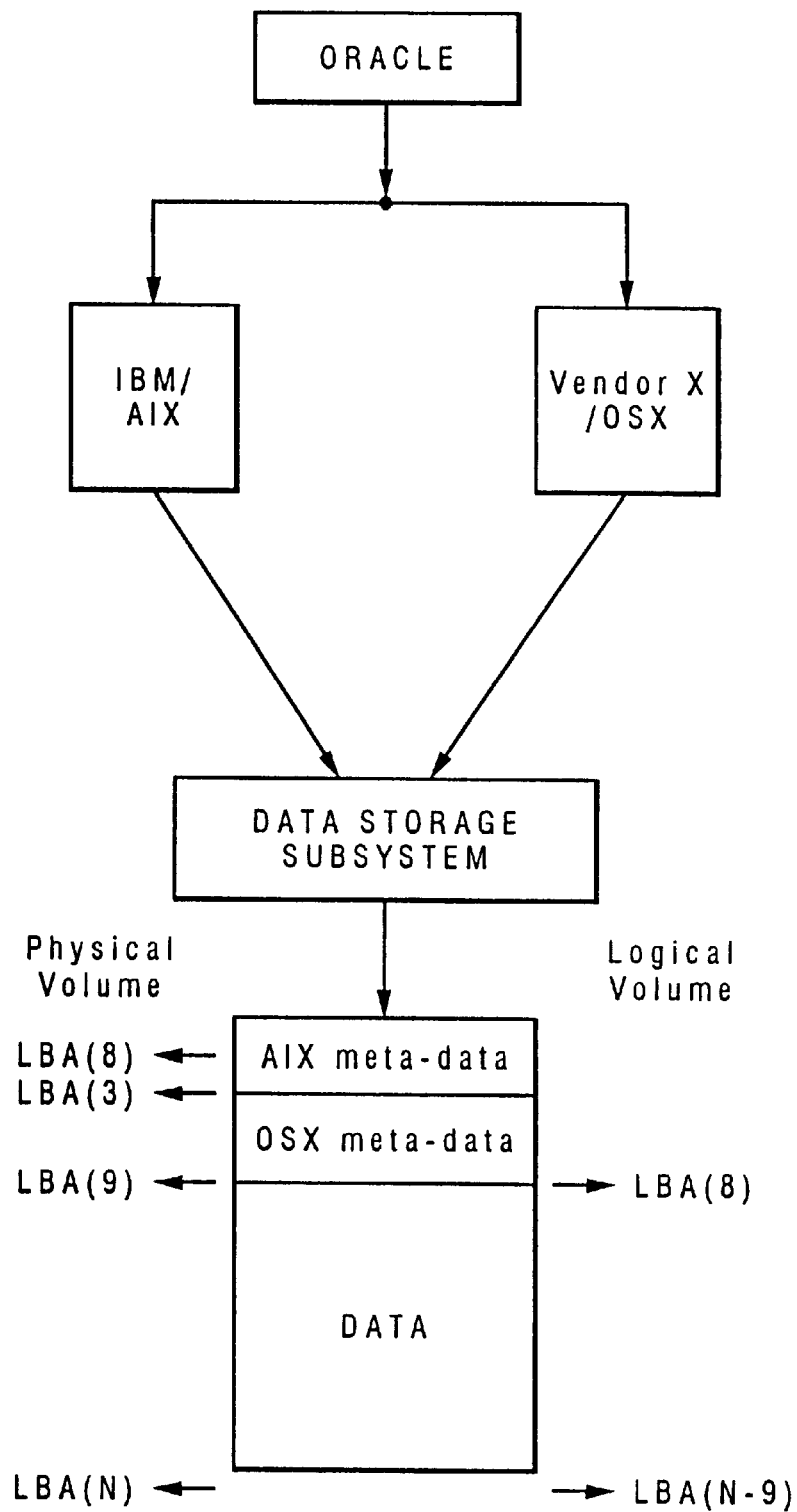
FIG. 5A depicts a partially schematic representation of the way in which the method and process of the present invention stores the data within the data storage subsystem such that the heterogeneous computing system can share the data with the disk.
Figure 5B:
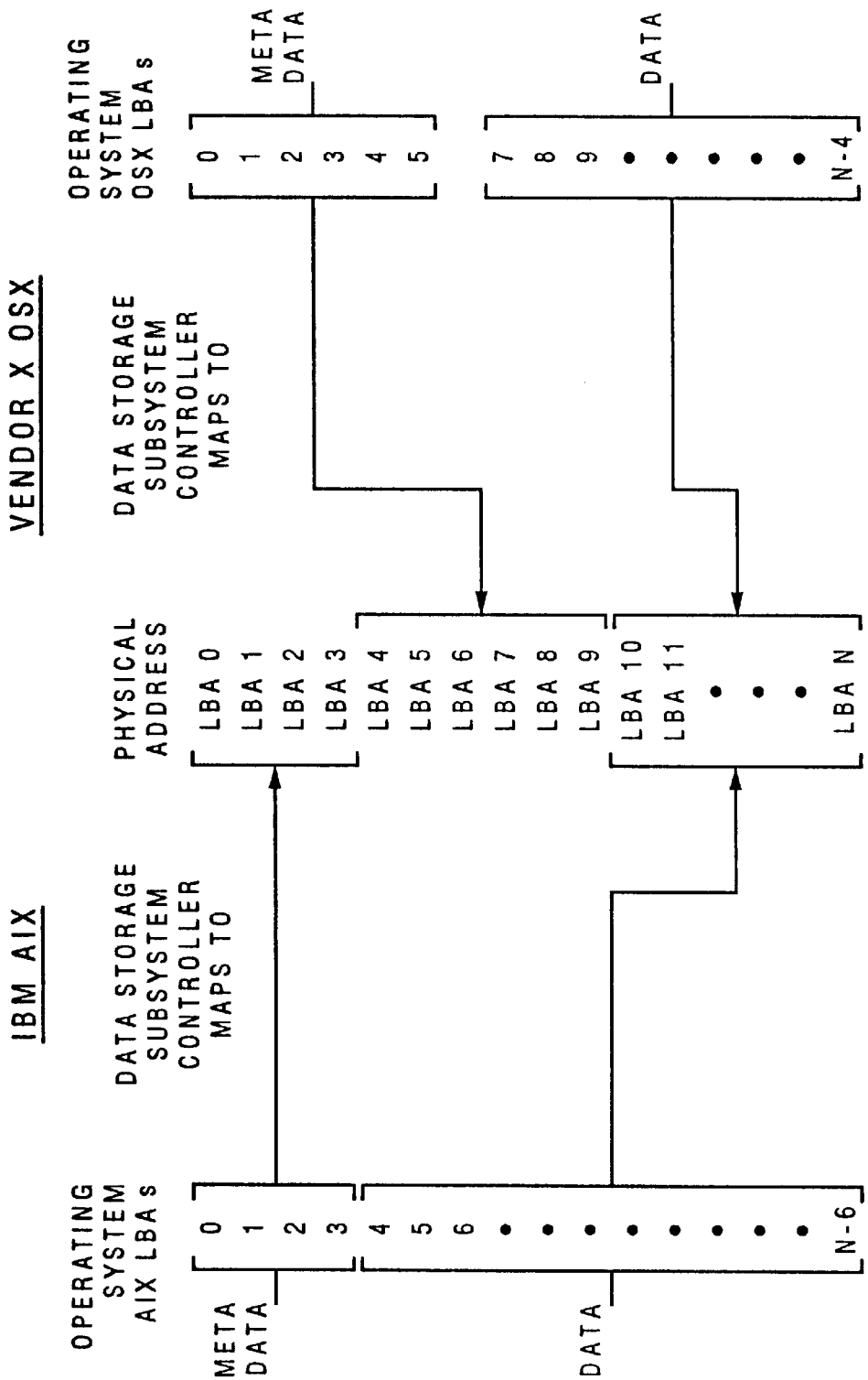
FIG. 5B is an illustration of how a data storage subsystem controller utilizing the method and process of the present invention achieves its transparency.

The foregoing rather abstract description becomes more clear with reference to FIGS. 5A and 5B. FIG. 5A is a partially schematic representation of the way in which the method and process of the present invention stores the data within the data storage subsystem such that the heterogeneous computing system can share the data with the disk. Shown is the storing of meta-data for two different computing systems: one running AIX (stored as meta-data at LBA 0 through LBA 3) and another computer running another version of UNIX denoted as OSX (stored as meta-data at LBA 4 through LBA 9). FIG. 5B is an illustration of how a data storage subsystem controller utilizing the method and process of the present invention achieves its transparency. After initial program load, the data storage subsystem controller informs the IBM system running AIX that IBM system running AIX has meta-data stored at LBA 0 through LBA 3, and disk storage space of LBA 4 through LBA (N–6). This is because 6 LBAs are being consumed by vendor X computing system running OSX. Additionally, vendor X computing system running OSX is informed that OSX meta-data is stored at LBA 0 through LBA 5 and that computing system running OSX has data storage space from LBA 6 through LBA (N–4). This is because 4 LBAs are being consumed by IBM AIX meta-data and hence are not available to vendor X running OSX. Subsequently, the data storage subsystem controller translates IBM or vendor X requests for LBAs into the true LBA of the data storage subsystem. For example, if in the example shown, IBM AIX requests access to data in LBA 22, the data storage subsystem controller will then translate the requested LBA to LBA (22+6)=LBA 28. Likewise, a request by vendor X for LBA 22 will be translated to LBA (22+4)=LBA 26. The translations occurs because LBA 0 through LBA 9 are consumed by meta-data. On the other hand, if IBM computing system running AIX requests access to LBA 2, the data storage subsystem controller will access LBA 2 because in this instance the logical address corresponds to the physical address. In contrast, if vendor X computing system running to OSX requests access to LBA 2, the data storage subsystem controller will translate that request to LBA (2+4)=LBA 6 since LBA 0 through LBA 3 are consumed by the meta-data for IBM AIX which means that logical LBA 0, LBA 1, and LBA 2 for the vendor X system equates to physical LBA 4, LBA 5, and LBA 6 in the data storage subsystem. This translation mechanism can be extended indefinitely for different subsystems attached.

The foregoing steps will now by explained in detail in the following figures.

With reference now to the figures and in particular with reference now to FIG. 1, there is depicted a pictorial representation of a data-processing system which can be utilized in accordance with the method and system of the present invention. The system and method provided by the present invention can be implemented with the data-processing system depicted in FIG. 1. A computer 20 is depicted which includes a system unit 22, a video display terminal 24, a keyboard 26, and a mouse 28. Computer 20 may be implemented utilizing any suitable computer such as the IBM RISC/6000 computer products of International Business Machines Corporation, located in Armonk, N.Y. "RISC SYSTEM/6000" is a trademark of International Business Machines Corporation.

Figure 2:
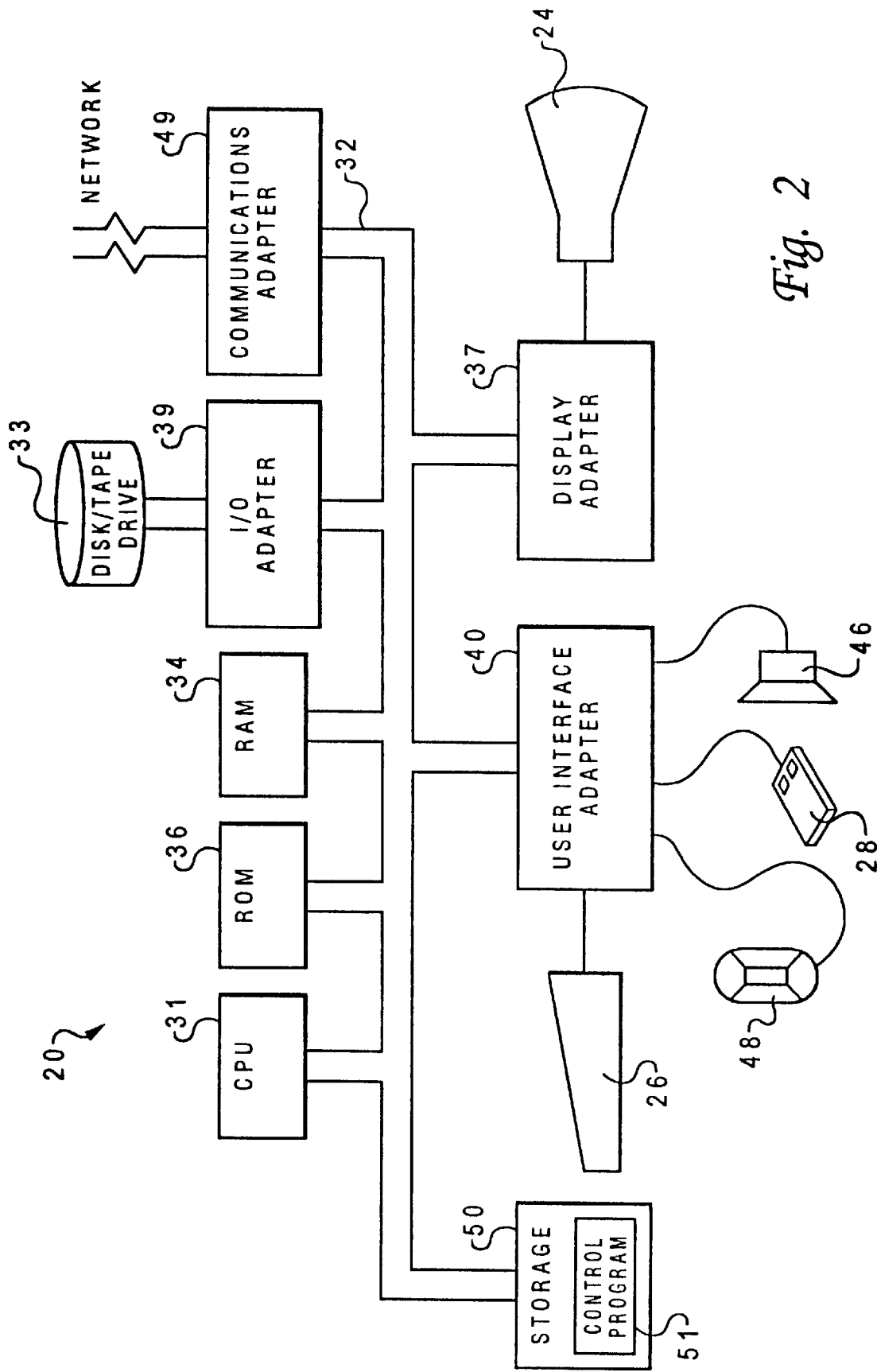
FIG. 2 is an illustration of a representative hardware environment which can be utilized in accordance with the method and system of the present invention.

FIG. 2 is an illustration of a representative hardware environment which can be utilized in accordance with the method and system of the present invention. FIG. 2 depicts selected components in computer 20 in which a preferred embodiment of the present invention may be implemented. Computer 20 includes a Central Processing Unit ("CPU") 31, such as a conventional microprocessor, and a number of other units interconnected via system bus 32. Such components and units of computer 20 can be implemented in a system unit such as system unit 22 of FIG. 1. Computer 20 further includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32. Video display terminal 24 is the visual output of computer 20, which can be a CRT-based video display well-known in the art of computer hardware. However, with a portable or notebook-based computer, video display terminal 24 can be replaced with an LCD-based or a gas plasma-based flat-panel display. Computer 20 further includes user interface adapter 40 for connecting keyboard 26, mouse 28, speaker 46, microphone 48, and/or other user interface devices, such as a touch screen device (not shown), to system bus 32. Communication adapter 49 connects computer 20 to a data-processing network.

Computer 20 also includes a graphical user interface that resides within a machine-readable media to direct the operation of computer 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 31, such as touch-screen technology or human voice control. In addition, computer 20 includes a control program 51 which resides within computer storage 50. Control program 51 contains instructions that when executed on CPU 31 carries out the operations depicted in the logic flow chart of FIG. 5 described herein.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

In the example depicted in FIG. 2, the computer program product (i.e. control program 51) can reside in computer storage 50. However, it is important that while the present invention has been, and will continue to be, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analogue communication links.

Figure 3:
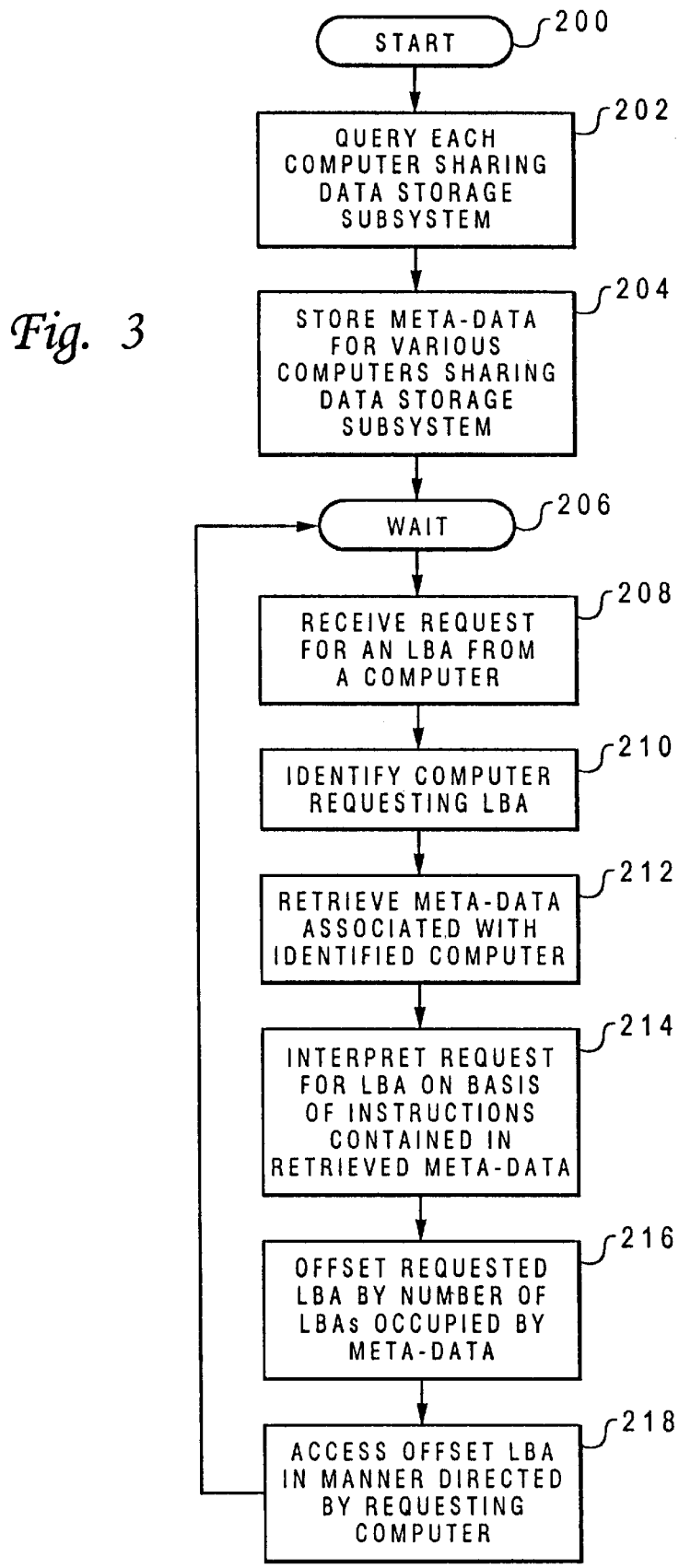
FIG. 3 depicts a high-level logic flowchart which depicts the method and process of the present invention.

Refer now to FIG. 3, which is a high-level logic flowchart which depicts the method and process of the present invention. Method step 200 depicts the start of the process. Method stop 202 illustrates that at initial program load each computer (disk subsystem software (and or microcode)) sharing a data storage subsystem is queried by a data storage subsystem controller. In the query of method step 202, each computer sharing a data storage subsystem is asked what operating system it is running.

Assuming that the query of method step 202 has been answered, at this point in the process it is known what computers are attached to and intend to share the data storage subsystem and it is also known what operating systems those attached computers are running. Method step 204 depicts the storing of meta-data containing this knowledge within the initial LBAs of the data storage subsystem; that is, the meta-data stored identifies the different attached computing systems and the operating systems running on them.

Method step 206 illustrates the method and process entering a wait state. Method step 208 shows the event of the data storage subsystem controller receiving a request for access to a specific LBA. Method step 210 shows the identification of the computer requesting access. Method step 212 depicts the retrieval of the meta-data associated with the computing system requesting data access (i.e. the meta-data that was stored in method step 204). Method step 214 illustrates the interpretation of the request for data access on the basis of the operating system instructions that were in the retrieved meta-data. Method step 216 illustrates offsetting the LBA by the amount of LBAs consumed by the meta-data stored. Method step 218 shows accessing the offset LBA in the manner directed by the requesting computing system. Subsequent to method step 218, the process returns to method step 208 and enters a wait state.

The subsystem can use one of two approaches to manage the logical volume data and the data. Approach ONE is as described in FIG. 5. Using this approach, each disk has a different size on each operating system. A second approach is to represent each disk as the same size for each operating system. Call this second approach "Approach TWO". Using Approach 2 provides a more consistent view of the data to each system and is very straightforward. Following is a description of this approach.

The storage subsystem determines how much space each system needs for it's meta-data. This determination is the same as approach one. However, the storage subsystem follows the following steps to create the same size AND address for the data area on the disk:

1. The storage subsystem determines which system requires the largest meta-data area.
2. The storage subsystem uses this size as the amount of meta-data space each system will require.
3. For each system the storage subsystem performs the following:
   A. For that system it determines how much space the storage subsystem's device driver (or other storage management program) will need to claim to make up the difference between that system's required meta-data and the maximum system's meta-data. Call this claimed size "Storage Subsystem Owned Meta-Data Size".
   B. That system's device driver (or storage management program) will query the storage subsystem to obtain the "Storage Subsystem Owned Meta-Data Size" for that system.
   C. That system's device driver (or storage management program) will then claim the space represented by the "Storage Subsystem Owned Meta-Data Size" and directly following that system's meta-data.
   D. As a result, each system will see a data map that contains the following:
      I. System's Required Meta-Data
      II. Storage Subsystem Owned Meta-Data
      III. Data
   E. Adding I and II together creates the size of the maximum system's meta-data.
4. The rest of the space can then be used by one application to share data between heterogeneous systems.
5. To access an LBA on each system the same steps are used as for Approach ONE, with one exception. The one exception is that Approach TWO needs to add I (the system's required meta-data) and II (the Storage Subsystem Owned Meta-Data) when calculating the LBA to use.

Figure 4:
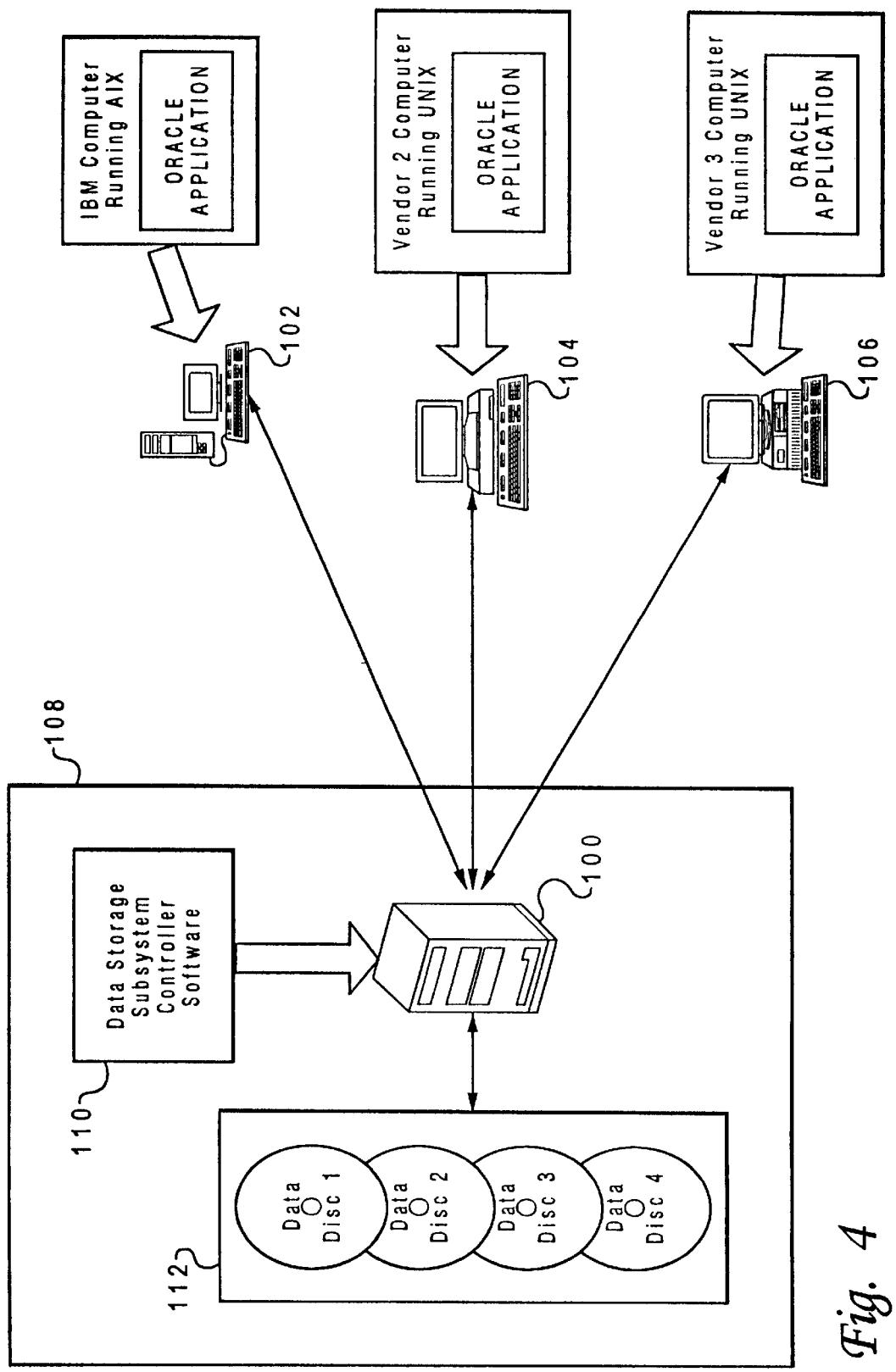
FIG. 4 depicts a partially schematic view of a system which will be utilized to illustrate the functioning of one embodiment of the present invention.

With reference now to FIG. 4, there is depicted a partially schematic view of a system which will be utilized to illustrate the functioning of one embodiment of the present invention. Shown is data storage subsystem controller unit 100 to which heterogeneous computing systems 102, 104, and 106 are attached. Shown are three heterogeneous computing systems IBM computer running AIX 102, Vendor 2 Computer running vendor 2 UNIX 104 and Vendor 3 computer running vendor 3 UNIX 106 which are disparate and which are all sharing data storage subsystem 108. That is, all three versions of UNIX used Zare distinct and incompatible. Data storage subsystem 108 is shown composed of 4 data storage disks 112 and controlled by a data storage subsystem controller unit 100 running data storage subsystem controller software 110. Data storage subsystem controller software 110 effectively controls the data storage subsystem controller unit 100 to carry out the method and process shown in FIG. 3. It will be understood by those skilled in the art that the foregoing is just one of a number of possible embodiments of the present invention.

Using FIG. 4 as an example of a system utilizing the method and process of the invention, at initial program load data storage subsystem controller unit 100 would first carry out method step 202 and query attached computers 102, 104, and 106. In response to this query, data storage subsystem controller unit 100 would learn that computer 102 is running AIX, computer 104 is running Vendor 2 UNIX, and computer 106 is running Vendor 3 UNIX. Consequently, data storage subsystem controller unit 100 would then carry out method step 204. Assume for sake of illustration that data storage subsystem controller unit 100 would store meta-data at LBA 0 through LBA 3 which associates AIX operating system instructions with computing system 102, at LBA 4 through LBA 7 which associates Vendor 2 UNIX operating system instructions with computing system 104, and at LBA 8 through LBA 11 which associates UNIX operating system instructions with computing system 106.

Subsequently, data storage subsystem controller unit 100 would carry out method step 206 and enter a wait state. At some random point in time, assume that computer 102 contacts data storage subsystem controller unit 100 asking for access to data within the data storage subsystem 108. In response to this request, data storage subsystem controller unit 100 first carries out method step 210 and identifies the requesting computer as computer 102. Data storage subsystem controller unit 100 then carries out method step 212 and consults the previously stored meta-data associated with computer 102 and learns that computer 102 is running AIX. In response, data storage subsystem controller unit 100 then carries out method step 214 and interprets the request for data from computer 102 utilizing AIX and determines which LBA computer 102 is requesting access to.

After data storage subsystem controller unit 100 has determined the LBA that computer 102 wishes to access, data storage subsystem controller unit 100 effectuates method step 216 and offsets the LBA requested by the number of LBAs appropriate to the computing systems attached. The fashion in which the LBAs will be offset will be as discussed previously in relation to FIG. 5. Subsequently, data storage subsystem controller unit 100 accesses (as set forth in method step 218) the requested LBA, offset as appropriate, in the manner directed by computer 102 and returns the data to computer 102 in the format dictated by AIX. After this, data storage subsystem controller unit 100 re-enters its wait state.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. An improved data storage method, to be utilized with heterogeneous computing systems, which allows said heterogeneous computing systems to have direct access to common data storage areas on a shared data storage subsystem such that said method is transparent to said heterogeneous computing systems, said method comprising the steps of:

querying all computing systems having direct access to common data storage areas of a shared data storage subsystem as to the operating systems utilized by said computing systems having direct access; in response to said querying step, creating and storing meta-data which associates each of said computing systems having direct access with an operating system;

in response to a request from one of said computing systems having direct access for access to a data storage area within said shared data storage subsystem, retrieving said stored meta-data associated with said one of said computing systems having direct data access which is requesting access to said data storage area within said shared data storage subsystem, wherein said retrieving includes the steps of identifying which of said heterogeneous computing systems having direct access is making said request for access to a data storage area, determining the linear block addresses of meta-data associated with said identified computer in response to said identifying step and, in response to said determining step, retrieving said meta-data associated with said identified computer from said determined linear block addresses of the meta-data associated with said identified computer; and utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems.

2. The method of claim 1, wherein said querying step further comprises the step of, at initial program load, querying all computing systems having direct access to common data storage areas of a shared data storage subsystem as to the operating systems utilized by said computing systems having direct access.

3. The method of claim 1, wherein said creating and storing step further comprises the steps of:

creating at least one set of meta-data for each different operating system being utilized by said heterogeneous computing systems having direct access; and storing said created at least one set of meta-data at the initial contiguous linear block addresses of said data storage subsystem such that said at least one set of meta-data is associated with each of said heterogeneous computing systems running an operating system to which said at least one set of meta-data corresponds.

4. The method of claim 3 wherein said association of said at least one set of meta-data with each of said heterogeneous computing systems further comprises the step of creating a table which maps each of said heterogeneous computing systems to the area of said data storage subsystem wherein said meta-data for said each of said heterogeneous computing systems resides.

5. The method of claim 1 wherein said data storage subsystem further includes a data storage subsystem controller and said utilizing step further comprises the steps of:

utilizing said retrieved stored meta-data to enable said data storage subsystem controller to interpret said request for access to said data storage area in a manner appropriate to the operating system of said computing system requesting access to said data storage area;

offsetting a linear block address, correspondent to said request for access to said data storage area, as appropriate dependent upon the character of said requested data and the amount and location of meta-data stored; and accessing said offset linear block address in a manner specified by said requesting computer system.

6. An improved data storage apparatus, to be utilized with heterogeneous computing systems, which allows said heterogeneous computing systems to have direct access to common data storage areas on a shared data storage subsystem such that the operation of said apparatus is transparent to said heterogeneous computing systems, said apparatus comprising:

means for querying all computing systems having direct access to common data storage areas of a shared data storage subsystem as to the operating systems utilized by said computing systems having direct access;

means, responsive to said means for querying, for creating and storing meta-data which associates each of said computing systems having direct access with an operating system;

means, responsive to a request from one of said computing systems having direct access for access to a data storage area within said shared data storage subsystem, for retrieving said stored meta-data associated with said one of said computing systems having direct data access which is requesting access to said data storage area within said shared data storage subsystem, said retrieving means including means for identifying which of said heterogeneous computing systems having direct access is making said request for access to a data storage area, means responsive to said identifying means for determining the linear block addresses of meta-data associated with said identified computer, and means responsive to said determining means for retrieving said meta-data associated with said identified computer from said determined linear block addresses of the meta-data associated with said identified computer; and means for utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems.

7. The apparatus of claim 6, wherein said means for querying further comprise means for querying, at initial program load, all computing systems having direct access to common data storage areas of a shared data storage subsystem as to the operating systems utilized by said computing systems having direct access.

8. The apparatus of claim 6, wherein said means for creating and storing further comprises:

means for creating at least one set of meta-data for each different operating system being utilized by said heterogeneous computing systems having direct access; and means for storing said created at least one set of meta-data at the initial contiguous linear block addresses of said data storage subsystem such that said at least one set of meta-data is associated with each of said heterogeneous computing systems running an operating system to which said at least one set of meta-data corresponds.

9. The apparatus of claim 8 wherein said association of said at least one set of meta-data with each of said heterogeneous computing systems further comprises means for creating a table which maps each of said heterogeneous computing systems to the area of said data storage subsystem wherein said meta-data for said each of said heterogeneous computing systems resides.

10. The apparatus of claim 6 wherein said data storage subsystem further includes a data storage subsystem controller and said means for utilizing further comprises:

means for utilizing said retrieved stored meta-data to enable said data storage subsystem controller to interpret said request for access to said data storage area in a manner appropriate to the operating system of said computing system requesting access to said data storage area;

means for offsetting a linear block address, correspondent to said request for access to said data storage area, as appropriate dependent upon the character of said requested data and the amount and location of meta-data stored; and means for accessing said offset linear block address in a manner specified by said requesting computer system.

11. An improved data storage program product, to be utilized with heterogeneous computing systems, which allows said heterogeneous computing systems to have direct access to common data storage areas on a shared data storage subsystem such that the operation of said program product is transparent to said heterogeneous computing systems, said program product comprising:

instruction means for querying all computing systems having direct access to common data storage areas of a shared data storage subsystem as to the operating systems utilized by said computing systems having direct access;

instruction means, responsive to said instruction means for querying, for creating and storing meta-data which associates each of said computing systems having direct access with an operating system;

instruction means, responsive to a request from one of said computing systems having direct access for access to a data storage area within said shared data storage subsystem, for retrieving said stored meta-data associated with said one of said computing systems having direct data access which is requesting access to said data storage area within said shared data storage subsystem, said instruction means for retrieving including instruction means for identifying which of said heterogeneous computing systems having direct access is making said request for access to a data storage area, instruction means, responsive to said instruction means for identifying, for determining the linear block addresses of meta-data associated with said identified computer, and instruction means, responsive to said instruction means for determining, for retrieving said meta-data associated with said identified computer from said determined linear block addresses of the meta-data associated with said identified computer;

instruction means for utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems; and signal bearing means bearing said instruction means for querying, said instruction means for creating and storing, said instruction means for retrieving, and said instruction means for utilizing.

12. The program product of claim 11 wherein said signal bearing media further comprises recordable media.

13. The program product of claim 11 wherein said signal bearing media further comprises transmission media.

14. The program product of claim 11, wherein said instruction means for querying further comprises instruction means for querying, at initial program load, all computing systems having direct access to common data storage areas of a shared data storage subsystem as to the operating systems utilized by said computing systems having direct access.

15. The program product of claim 11, wherein said instruction means for creating and storing further comprises:

instruction means for creating at least one set of meta-data for each different operating system being utilized by said heterogeneous computing systems having direct access; and instruction means for storing said created at least one set of meta-data at the initial contiguous linear block addresses of said data storage subsystem such that said at least one set of meta-data is associated with each of said heterogeneous computing systems running an operating system to which said at least one set of meta-data corresponds.

16. The program product of claim 15 wherein said association of said at least one set of meta-data with each of said heterogeneous computing systems further comprises instruction means for creating a table which maps each of said heterogeneous computing systems to the area of said data storage subsystem wherein said meta-data for said each of said heterogeneous computing systems resides.

17. The program product of claim 11 wherein said data storage subsystem further includes a data storage subsystem controller and said instruction means for utilizing further comprises:

instruction means for utilizing said retrieved stored meta-data to enable said data storage subsystem controller to interpret said request for access to said data storage area in a manner appropriate to the operating system of said computing system requesting access to said data storage area;

instruction means for offsetting a linear block address, correspondent to said request for access to said data storage area, as appropriate dependent upon the character of said requested data and the amount and location of meta-data stored; and instruction means for accessing said offset linear block address in a manner specified by said requesting computer system.

18. An improved data storage method which allows heterogeneous computing systems to have direct access to common data storage areas on a shared data storage subsystem having a data storage subsystem controller, such that said method is transparent to said heterogeneous computing systems, said method comprising the steps of:

querying all computing systems having direct access to common data storage areas of a shared data storage subsystem as to the operating systems utilized by said computing systems having direct access;

in response to said querying step, creating and storing meta-data which associates each of said computing systems having direct access with an operating system;

in response to a request from one of said computing systems having direct access for access to a data storage area within said shared data storage subsystem, retrieving said stored meta-data associated with said one of said computing systems having direct data access which is requesting access to said data storage area within said shared data storage subsystem; and utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems, said utilizing step including the steps of utilizing said retrieved stored meta-data to enable said data storage subsystem controller to interpret said request for access to said data storage area in a manner appropriate to the operating system of said computing system requesting access to said data storage area, offsetting a linear block address, correspondent to said request for access to said data storage area, as appropriate dependent upon the character of said requested data and the amount and location of meta-data stored, and accessing said offset linear block address in a manner specified by said requesting computer system.

19. An improved data storage apparatus which allows heterogeneous computing systems to have direct access to common data storage areas on a shared data storage subsystem having a data storage subsystem controller, such that the operation of said apparatus is transparent to said heterogeneous computing systems, said apparatus comprising:

means for querying all computing systems having direct access to common data storage areas of a shared data storage subsystem as to the operating systems utilized by said computing systems having direct access;

means, responsive to said means for querying, for creating and storing meta-data which associates each of said computing systems having direct access with an operating system;

means, responsive to a request from one of said computing systems having direct access for access to a data storage area within said shared data storage subsystem, for retrieving said stored meta-data associated with said one of said computing systems having direct data access which is requesting access to said data storage area within said shared data storage subsystem; and means for utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems, said utilizing means including means for utilizing said retrieved stored meta-data to enable said data storage subsystem controller to interpret said request for access to said data storage area in a manner appropriate to the operating system of said computing system requesting access to said data storage area, means for offsetting a linear block address, correspondent to said request for access to said data storage area, as appropriate dependent upon the character of said requested data and the amount and location of meta-data stored, and means for accessing said offset linear block address in a manner specified by said requesting computer system.

20. An improved data storage program product which allows heterogeneous computing systems to have direct access to common data storage areas on a shared data storage subsystem having a data storage subsystem controller, such that the operation of said program product is transparent to said heterogeneous computing systems, said program product comprising:

instruction means for querying all computing systems having direct access to common data storage areas of a shared data storage subsystem as to the operating systems utilized by said computing systems having direct access;

instruction means, responsive to said instruction means for querying, for creating and storing meta-data which associates each of said computing systems having direct access with an operating system;

instruction means, responsive to a request from one of said computing systems having direct access for access to a data storage area within said shared data storage subsystem, for retrieving said stored meta-data associated with said one of said computing systems having direct data access which is requesting access to said data storage area within said shared data storage subsystem;

instruction means for utilizing said retrieved meta-data to correctly interpret and respond to said request for access to said data storage area in a manner consonant with the operating system of said one of said computing systems having direct access which is requesting access to said data storage area within said shared data storage subsystem such that said heterogeneous computing systems are able to have direct access to said common data storage areas on said shared data storage subsystem in a manner transparent to said requesting computing systems, said instruction means for utilizing including instruction means for utilizing said retrieved stored meta-data to enable said data storage subsystem controller to interpret said request for access to said data storage area in a manner appropriate to the operating system of said computing system requesting access to said data storage area, instruction means for offsetting a linear block address, correspondent to said request for access to said data storage area, as appropriate dependent upon the character of said requested data and the amount and location of meta-data stored, and instruction means for accessing said offset linear block address in a manner specified by said requesting computer system; and signal bearing means bearing said instruction means for querying, said instruction means for creating and storing, said instruction means for retrieving, and said instruction means for utilizing.

* * * * *

UNITED STATES PATENT AND TRADEMARK OFFICE
CERTIFICATE OF CORRECTION

PATENT NO. : 5,926,833
DATED : July 20, 1999
INVENTOR(S) : Rasoulian et al.

It is certified that error appears in the above-identified patent and that said Letters Patent is hereby corrected as shown below:

COLUMN

2, Line 1 after the customer does not want to have to have ten disks add "for";

2, Line 2 delte "or" and replace with --for--;

2, Line 67 delete "da" and replace with --data--; and

4, Line 42 delted "ID".

Signed and Sealed this

Sixteenth Day of May, 2000

Attest:

Q. TODD DICKINSON

Attesting Officer     Director of Patents and Trademarks